United States Patent
Hsieh

(10) Patent No.: US 9,371,852 B2
(45) Date of Patent: Jun. 21, 2016

(54) ELECTRONIC SCREW AND SCREW TORQUE SENSING DEVICE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 117 days.

(21) Appl. No.: 14/472,356

(22) Filed: Aug. 28, 2014

(65) Prior Publication Data

US 2015/0063941 A1 Mar. 5, 2015

(30) Foreign Application Priority Data

Sep. 2, 2013 (TW) .............................. 102131587 A

(51) Int. Cl.
*F16B 31/02* (2006.01)
*G01L 5/24* (2006.01)

(52) U.S. Cl.
CPC ............... *F16B 31/025* (2013.01); *F16B 31/02* (2013.01); *G01L 5/24* (2013.01)

(58) Field of Classification Search
CPC ...... F16B 31/02; F16B 2031/022; G01L 5/24
USPC ................................................ 411/8, 13, 14
See application file for complete search history.

(56) References Cited

U.S. PATENT DOCUMENTS

| | | | | |
|---|---|---|---|---|
| 4,313,341 A * | 2/1982 | Yamaguchi | ........... | F02P 5/1455 73/114.15 |
| 5,044,204 A * | 9/1991 | Leighton | ................. | F16B 31/02 29/761 |
| 6,059,500 A * | 5/2000 | Dirmeier | ............... | F16B 11/006 411/14 |
| 7,293,466 B2 * | 11/2007 | Ohta | ....................... | F16B 31/02 257/417 |
| 2003/0000314 A1 * | 1/2003 | Smith | .................... | G01L 1/2225 73/849 |
| 2008/0253858 A1 * | 10/2008 | Hsieh | ...................... | F16B 31/02 411/14 |
| 2010/0054891 A1 * | 3/2010 | Nishida | ................... | F16B 31/02 411/9 |
| 2010/0077872 A1 * | 4/2010 | Hsieh | ....................... | G01L 5/24 73/862.627 |

* cited by examiner

*Primary Examiner* — Flemming Saether
(74) *Attorney, Agent, or Firm* — CKC & Partners Co., Ltd.

(57) ABSTRACT

An electronic screw with an electronic torque display is disclosed. The screw includes a body and a torque sensing element. The body has a threading head, a shank connected to the threading head and a recess located on the side wall of the shank. The torque sensing element is disposed in the recess and detected the torque value of the electronic screw. The torque sensing element is electrically connected to the electronic torque display, wherein the electronic torque display displays the torque value that detected from the torque sensing element.

10 Claims, 5 Drawing Sheets

ELECTRONIC SCREW AND SCREW TORQUE SENSING DEVICE

RELATED APPLICATIONS

This application claims priority to Taiwan Application Serial Number 102131587, filed Sep. 2, 2013, which is herein incorporated by reference.

BACKGROUND

1. Technical Field

The present disclosure relates to a hand tool. More particularly, the present disclosure relates to an electronic screw and a screw torque sensing device.

2. Description of Related Art

In recent years, the development of hand tool has been towards electronic development. In order to make the general consumers easier to use, a variety of easy-to-operate hand tools or user-friendly electronic hand tools have been launched to market. A hand tool is a tool used to wrench a screw fixing part to screw the two objects together. If the hand tools are used in aviation and of her precision instruments, the lock strength is need to be very precise and the gyration angle is also an essential consideration. Therefore dealers have developed a variety of hand tools for different gauges.

To adapt to the need of precise torque on screw for modern industry, the screws that used in the joint connection of two parts of transport, bridges and bridge deck and two shell plates of an aircraft have replaced the ordinary precision screw with the engineering screw. The engineering screw is strengthened by precision machining technology, sized accurately and inside disposed a stress sensing device. However, fatigue and loss of safety shorten service life of the engineering screw. The engineering screw is prone to break or malfunction, especially which is long-term exposed to the weather, undergoes earthquake or works in extreme environments, thereby affecting the overall safety of project or equipment. Therefore the engineering screw need regular maintenance, detection and replaced to prevent significant harm, which is caused by data errors or breakage.

On the other hand, regular lifetime inspection of engineering screw done by manual operation is so far from satisfactory. There are omissions of engineering screw stress determination, such as relatively small structural defects of engineering screw is hard to directly determine by naked-eye inspection, thus technician need to further check the structural detection of engineering screw. Furthermore, the sensitivity of stress sensing device depends on the location of stress sensing device that is disposed on engineering screw. In addition, the passed oscillatory wave or the torsion effect of the screw is different because of the different position of the screw. The technician have to individually detect whether the structure of screw is stable. Therefore, the manual measurement for the periodic testing of various engineering screws spend a lot of time and labor costs.

SUMMARY

According to an embodiment of the present disclosure, an electronic screw is provided. The electronic screw is cooperated with an electronic torque display for measuring a torque value, and includes a body and a torque sensing element. The body includes a threading head, a shank and a recess. The shank connected to the threading head includes a neck portion and a threading portion, wherein one end of the neck portion is connected to the threading head and the threading, portion is connected to the other end of the neck portion. The recess is located on a side wall of the shank, wherein one third of a volume of the recess is located on the neck portion, and two thirds of the volume of the recess is located on the threading portion. The torque sensing element is disposed in the recess and electrically connected to the electronic torque display.

According to another embodiment of present disclosure, a screw torque sensing device includes a body, an electronic torque display and a torque sensing element. The body includes a threading head, a shank and a recess. The shank connected to the threading head includes a neck portion and a threading portion, wherein one end of the neck portion is connected to the threading head and the threading portion is connected to the other end of the neck portion. The recess is located on a side wall of the shank, wherein one third of a volume of the recess is located on the neck portion, and two thirds of the volume of the recess is located on the threading portion. The electronic torque display is movably mounted on the threading head. The torque sensing element is disposed in the recess and electrically connected to the electronic torque display.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
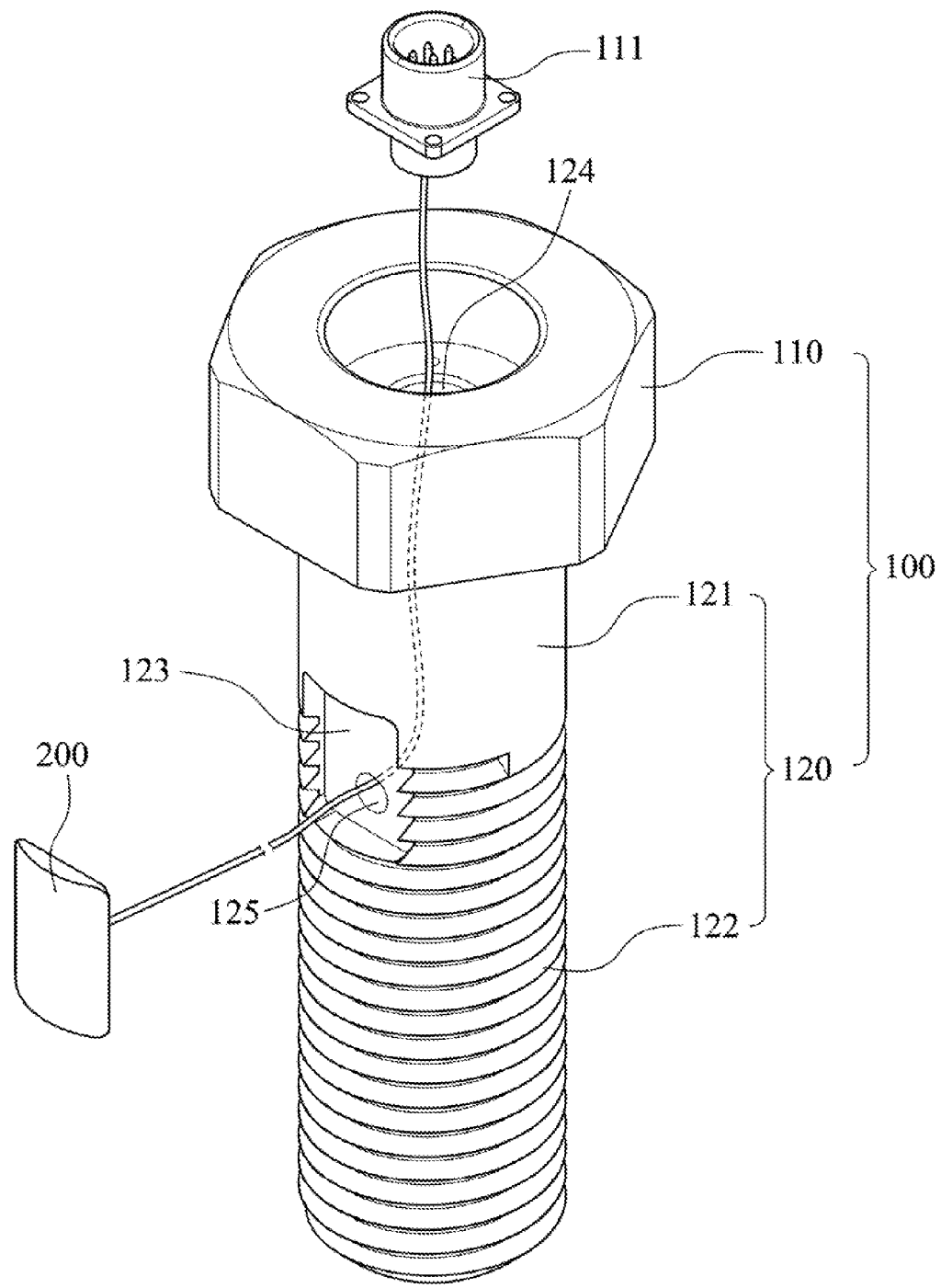
FIG. 1 is an exploded view of an electronic screw according to one embodiment of the present disclosure.
Figure 2:
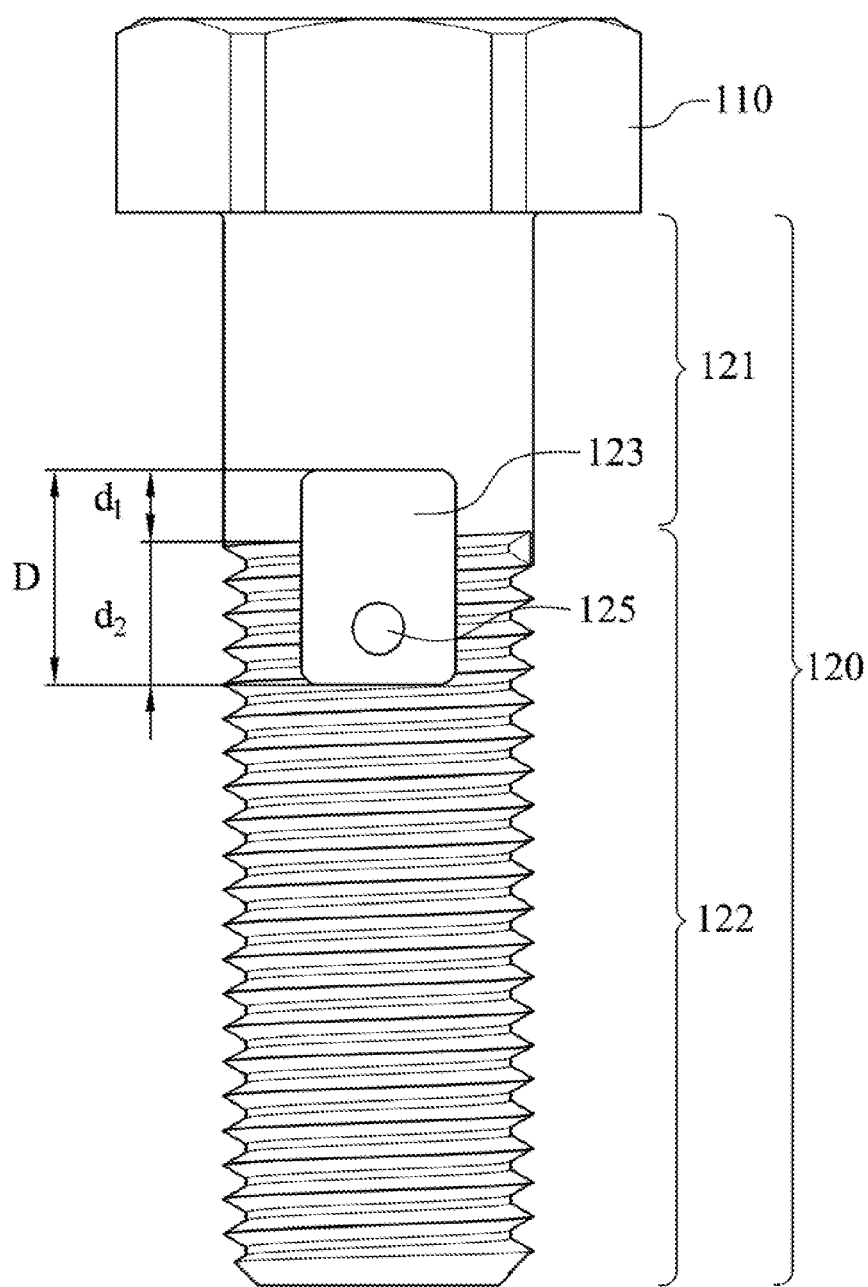
FIG. 2 is a side view of the electronic screw of FIG. 1.

FIG. 1 is an exploded view of an electronic screw according to one embodiment of the present disclosure. FIG. 2 is a side view of the electronic screw of FIG. 1. In FIGS. 1 and 2, the electronic screw, which is cooperated with an electronic torque display (not shown) for measuring a torque value. The electronic screw includes a body 100 and a torque sensing element 200.

The body 100 is T-shaped in side view and includes a threading head 110, a shank 120 and a recess 123. The threading head 110 is a polygon and includes at least an electronic leg 111, which is exposed to the threading head 110. The shank 120 is connected to the threading head 110, and includes a neck portion 121 and a threading portion 122, wherein one end of the neck portion 121 is connected to the threading head 110 and the threading portion 122 is connected to the other end of the neck portion 121. The recess 123 is located on a side wall of the shank 120, wherein one third of the volume d1 of the recess 123 is located on the neck portion 121, and two thirds of the volume d2 of the recess 123 is located on the threading portion 122. Both of width and depth of the whole of the recess 123 are constants according to this embodiment, thus the length of the recess 123 represents the volume of the recess 123. Both of the width and depth are constants, only the length is varied, so as to be expressed volume as d1 and d2. In addition, the threading head 110 of the body 100 includes a threading head recess 124, and the recess 123 includes a connecting channel 125, wherein the connecting channel 125 is connected to the threading head recess 124, and at least one wire (not shown) is located in the connecting channel 125.

The torque sensing element 200 is disposed in the recess 123 and electrically connected to the electronic torque display (not shown). The volume D of the recess 123 is greater than or equal to the volume of the torque sensing element 200, thereby the disposed location of the torque sensing element 200 is below the surface of the junction of the neck portion 121 and the threading portion 122.

In this embodiment of the present disclosure, the torque sensing element 200 is more sensitive to detect the torque value borne by the body 100 date to the volume d1 of the recess 123 located on the neck portion 121 which is one third of the volume D of the recess 123 and the volume d2 of the recess 123 located on the threading portion 122 which is two third of the volume D of the recess 123. Thus, the torque sensing element 200 transmits the detected deformation amount from the body 100 through the wire (not shown) within the connecting channel 125 and the threading head recess 124, and the signal of the torque value can be transmitted to the electronic leg 111 on the threading head 110 which is electrically connected to the torque sensing element 200. Furthermore, the electronic leg 111 can be used with a removable electronic torque display (not shown). The electronic torque display is movably touched the electronic leg 111 that is disposed on the threading head 110. The electronic torque display can display the torque status, transmit the data values or alert the torque abnormal state according to the detected stress status from the torque sensing element 200.

Figure 3:
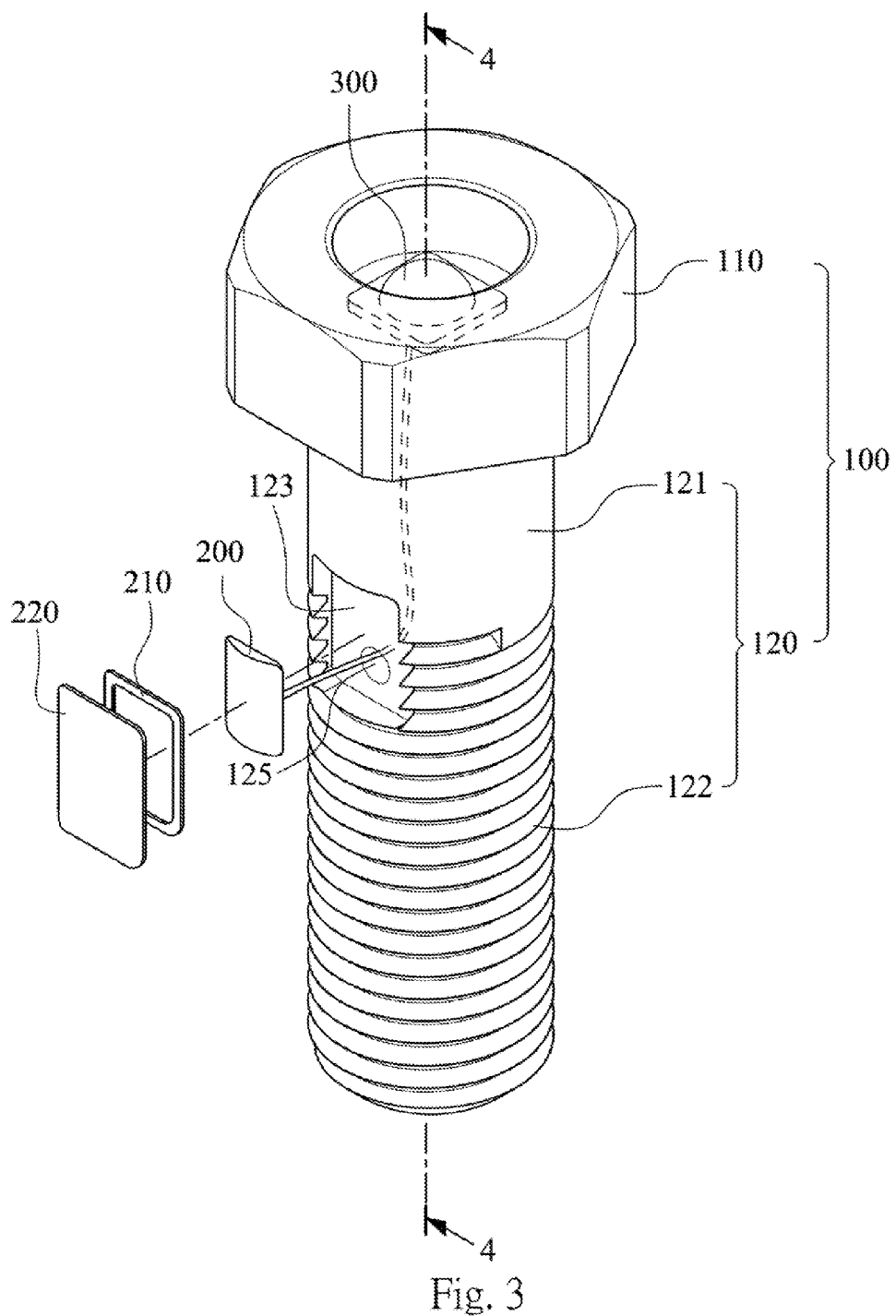
FIG. 3 is a three-dimensional view of a screw torque sensing device according to another embodiment of the present disclosure.
Figure 4:
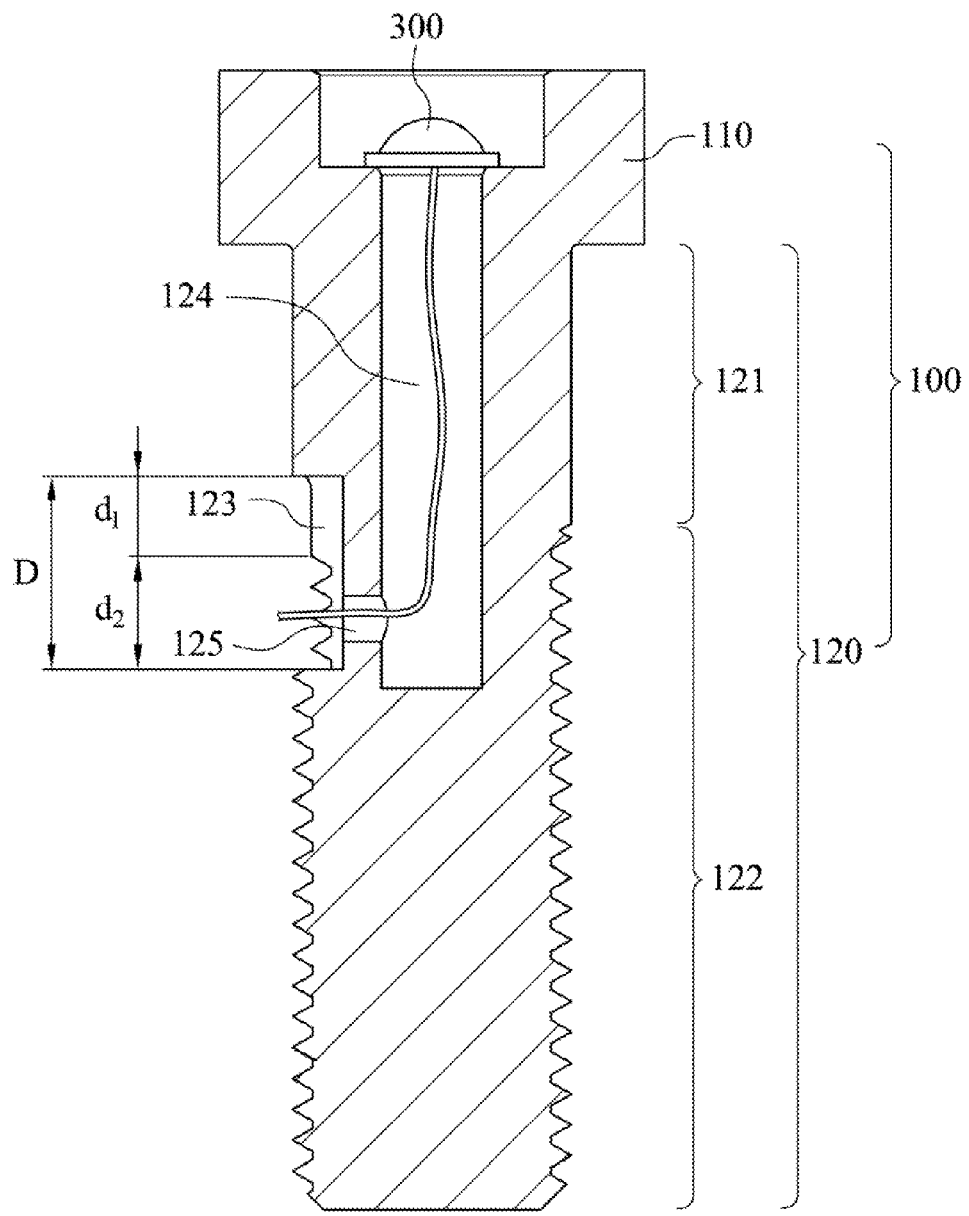
FIG. 4 is a cross-sectional view of the screw torque sensing device taken along line 4-4 of FIG. 3.
Figure 5:
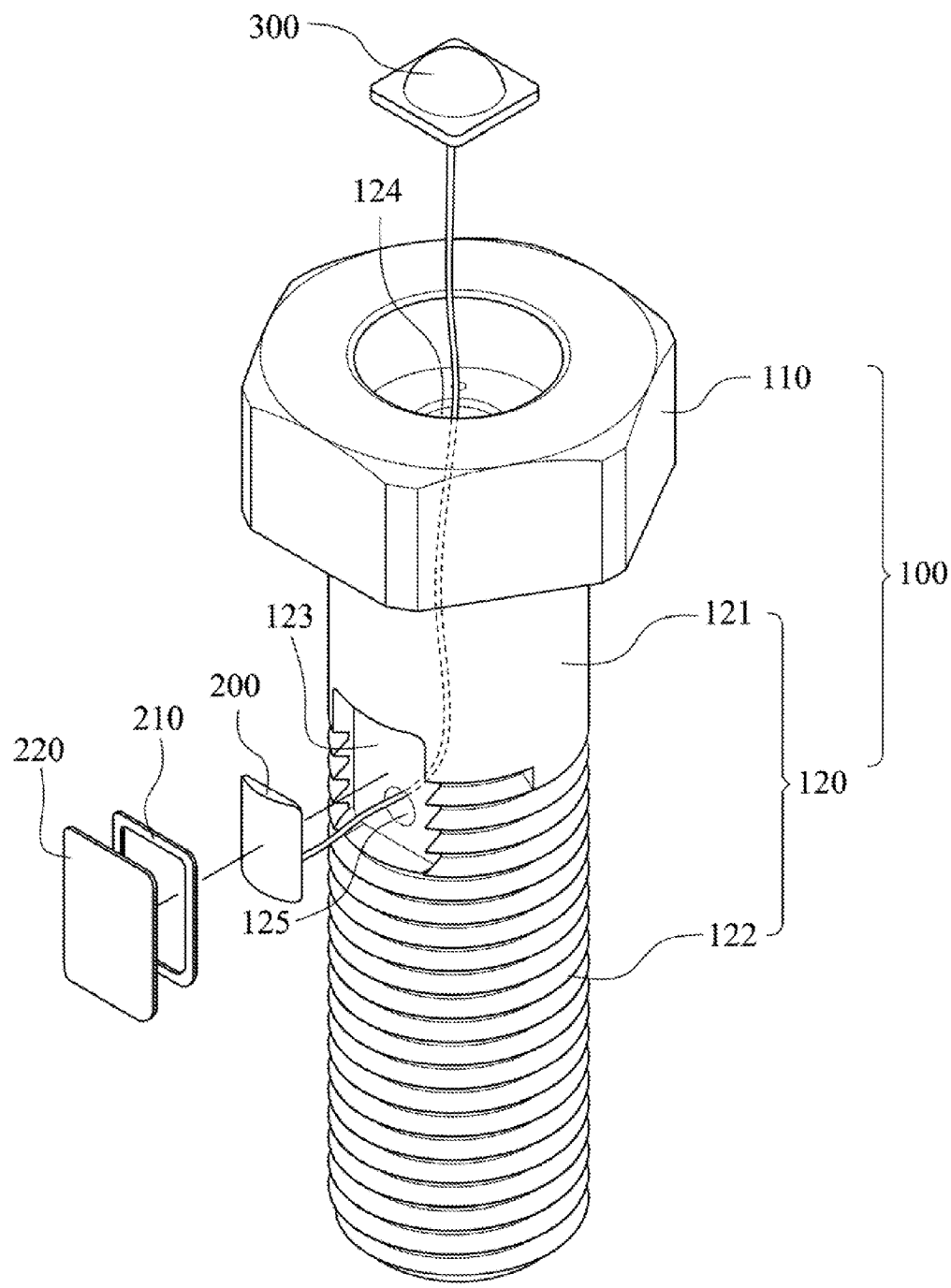
FIG. 5 is an exploded view of the screw torque sensing device of FIG. 3.

FIG. 3 is a three-dimensional view of a screw torque sensing device according to another embodiment of the present disclosure. FIG. 4 is a cross-sectional view of the screw torque sensing device taken along line 4-4 of FIG. 3. FIG. 5 is an exploded view of the screw torque sensing device of FIG. 3. In FIG. 3, the screw torque sensing device includes a body 100, an electronic torque display 300 and a torque sensing element 200.

The body 100 is T-shaped in side view and includes a threading head 110, a shank 120 and a recess 123. The shank 120 connected to the threading head 110, and includes a neck portion 121 and a threading portion 122, wherein one end of the neck portion 121 is connected to the threading head 110 and the threading portion 122 is connected to the other end of the neck portion 121. The recess 123 is located on a side wall of the shank 120, wherein one third of the volume d1 of the recess is located on the neck portion 121, and two thirds of the volume d2 of the recess is located on the threading portion 122. Both of width and depth of the whole of the recess 123 are constants according to this embodiment, thus the length of the recess 123 represents the volume of the recess 123. Both of the width and depth are constants, only the length is varied, so as to be expressed volume as d1 and d2. In addition, the threading head 110 of the body 100 includes a threading head recess 124, and the recess 123 includes a connecting channel 125, wherein the connecting channel 125 is connected to the threading head recess 124, and at least one wire (not shown) is located in the connecting channel 125.

The torque sensing element 200 is disposed in the recess 123. The disposed location of the torque sensing element 200 is below the surface of the junction of the neck portion 121 and the threading portion 122.

The electronic torque display 300 is movably mounted on the threading head 110. The torque sensing element 200 is electrically connected to the electronic torque display 300, and the detected deformation amount from the torque sensing element 200 can be transmitted to the electronic torque display 300 through the wire (not shown) within the connecting channel 125 and the threading head recess 124.

When operator use the body 100 to connect and fix two objects together, the torque sensing element 200 disposed in recess 123 of the screw torque sensing device sensitive detects the real time torque state of the body 100. The torque sensing element 200 transmits the detected stress signal from the body 100 by electrically connecting to the electronic torque display 300 through the wire (not shown) within the connecting channel 125 and the threading head recess 124.

If the electronic torque display 300 is a light emitting diode which is set according to an illuminating state, for example, the blue light is indicated that the torque value is in normal range and the red light is indicated that the torque value is above or below normal range. Therefore technician could immediately determine whether the torque value of the body 100 of the screw torque sensing device is normal or not by observing the color of the light emitting diode during regular maintenance, and then repair or replace the defective screws. It effectively simplifies the inspection process of precision parts and reduces the human operator errors.

Operator use the body 100 to fix two objects together. The torque sensing element 200 that is disposed in recess 123 detects the real time torque state of the body 100 because of the stress change, while the body 100 is pressurized by hand tool for fixing. The torque sensing element 200 transmits the detected stress signal by electrical wiring to the electronic torque display 300 through the connecting channel 125 and the threading head recess 124. The electronic torque display 300 displays the read torque value with number, color, word or audio.

If the electronic torque display 300 is set to numerical display mode, the detected stress signal from the torque sensing element 200 is transferred to a precise torque numeric data and displayed on the electronic torque display 300. If the electronic torque display 300 is set to color display mode, the different colors represent the different ranges of torque value. If the electronic torque display 300 is set to audio display mode, the different audio represents the normal or abnormal status of torque value. Therefore, technician can immediately determine and compare the torque value of the body 100 by the number, color or audio of the electronic torque display 300, and then immediately decide whether the screw is need to replace or the lock status between screw and related equipment is need to adjust. It effectively reduces the human operator errors in the detection of the body 100.

The screw torque sensing device further includes a cover 220 with a waterproof pad 210. The torque sensing element 200 is below the side wall surface of the shank 120, and the cover 220 with the waterproof pad 210 is disposed on the recess 123 for covering the torque sensing element 200.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic screw, which is cooperated with an electronic torque display for measuring a torque value, the electronic screw comprising:
a body comprising:
   a threading head; and
   a shank connected to the threading head, wherein the shank comprises:
      a neck portion, one end of the neck portion connected to the threading head, wherein the neck portion does not have a thread; and
      a threading portion connected to the other end of the neck portion;
   a recess located on a side wall of the shank, wherein one third of a volume of the recess is located on the neck portion, and two thirds of the volume of the recess is located on the threading portion; and
   a torque sensing element disposed in the recess and electrically connected to the electronic torque display, wherein one third of a portion of the torque sensing element is located within the neck portion and two thirds of the portion of the torque sensing element is located within the threading portion.

2. The electronic screw of claim 1, wherein the volume of the recess is greater than or equal to a volume of the torque sensing element.

3. The electronic screw of claim 1, wherein the threading head of the body comprises a threading head recess, and the recess comprises a connecting channel connected to the threading head recess.

4. The electronic screw of claim 3, wherein the threading head recess comprises an electronic leg.

5. A screw torque sensing device comprising:
a body comprising:
   a threading head; and
   a shank connected to the threading head, wherein the shank comprises:
      a neck portion, one end of the neck portion connected to the threading head, wherein the neck portion does not have a thread; and
      a threading portion connected to the other end of the neck portion;
   a recess located on a side wall of the shank, wherein one third of a volume of the recess is located on the neck portion, and two thirds of the volume of the recess is located on the threading portion;
a electronic torque display movably mounted on the threading head; and
a torque sensing element disposed in the recess and electrically connected to the electronic torque display, wherein one third of a portion of the torque sensing element is located within the neck portion and two thirds of the portion of the torque sensing element is located within the threading portion.

6. The screw torque sensing device of claim 5, wherein the electronic torque display comprises a light emission source, and the light emission source is set according to an illuminating state.

7. The screw torque sensing device of claim 6, wherein the light emission source is a light emitting diode.

8. The screw torque sensing device of claim 5, wherein the electronic torque display is for displaying a torque value of the torque sensing element.

9. The screw torque sensing device of claim 5, wherein the electronic torque display is for displaying a torque value from the torque sensing element with an audio.

10. The screw torque sensing device of claim 5, wherein the torque sensing element is below a side wall surface of the shank, and the screw torque sensing device further comprises a cover with a waterproof pad disposed on the recess for covering the torque sensing element.

* * * * *